United States Patent Office 3,207,805
Patented Sept. 21, 1965

3,207,805
DEHYDROGENATION IN THE PRESENCE OF OXYGEN AND AN AMMONIUM HALIDE
Richard J. Gay, Houston, Tex., assignor to Petro-Tex Chemical Corporation, Houston, Tex., a corporation of Delaware
No Drawing. Filed June 17, 1960, Ser. No. 36,705
18 Claims. (Cl. 260—680)

This invention relates to a process for dehydrogenating organic compounds and relates more particularly to the dehydrogenation of dehydrogenatable organic compounds at elevated temperatures in the presence of oxygen and an ammonium halide.

I have discovered that a great variety of dehydrogenatable organic compounds may be dehydrogenated to form unsaturated derivatives thereof by dehydrogenating such materials in admixture with oxygen and an ammonium halide in vapor phase at elevated temperatures. The invention is suitably carried out by passing a mixture of a dehydrogenatable organic compound containing the

group, that is, at least two adjacent carbon atoms singly bonded and each containing at least one hydrogen atom, an ammonium halide in amount greater than about 0.001 mol per mol of organic compound to be dehydrogenated and at least one-fourth mol of oxygen per mol of organic compound, at a temperature in the range of about 400° C. to about 850° C., and at an organic compound partial pressure equivalent to less than about 15 inches mercury at one atmosphere, to obtain the corresponding unsaturated organic compound derivative containing the grouping

The process of this invention can be applied to a great variety of organic compounds to obtain the corresponding unsaturated derivative thereof. Such compounds normally will contain from 2 to 20 carbon atoms, at least one

grouping, a boiling point below about 350° C., and such compounds may contain in addition to carbon and hydrogen, oxygen, halogens, nitrogen and sulphur.

Among the types of organic compounds which are successfully dehydrogenated to the corresponding unsaturated derivative by means of the novel process of this invention are alkanes, alkenes, alkyl halides, ethers, esters, aldehydes, ketones, acids, alkyl aromatic compounds, alkyl heterocyclic compounds, cyanoalkanes, cycloalkanes and the like. Illustrative compounds include ethylbenzene to styrene, isopropylbenzene to α-methyl styrene, ethylcyclohexane to styrene, cyclohexane to benzene, ethane to ethylene, propane to propylene, isobutane to isobutylene, n-butane to butene, butene to butadiene, methyl butene to isoprene, propionaldehyde to acrolein, ethyl chloride to vinyl chloride, propionitrile to acrylonitrile, methyl isobutyrate to methyl methacrylate, ethyl pyridine to vinyl pyridine and the like. Other representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl dichloride, butyl chloride, the chlorofluoroethanes, methyl pentane, methylethyl ketone, diethyl ketone, methyl propionate, and the like. This invention is practicularly adapted to the preparation of vinylidene compounds containing at least one $CH_2=C<$ group, that is, a group containing a terminal methylene group attached by a double bond to a carbon atom, and having 2 to 12 carbon atoms.

The ammonium halide employed may be ammonium iodide, ammonium bromide, ammonium chloride, or ammonium fluoride. Better results are normally obtained with ammonium iodide but good yields under conditions more precisely set forth hereinafter may be obtained with ammonium bromide and ammonium chloride and acceptable yields of desired product may be obtained with ammonium fluoride. The amount of ammonium halide normally used may be varied quite widely, usually an amount greater than about 0.001 mol of ammonium halide per mol of organic compound to be dehydrogenated will be used. More usually, at least about 0.01 mol of ammonium halide per mol of organic compound will be employed. Large amounts of ammonium halide may be used, as high as one mol or more per mol of organic compound to be dehydrogenated if desired, but it is one of the unexpected advantages of this invention that very small amounts of ammonium halide are required, normally less than about 0.5 mol of ammonium halide, as 0.2 mol, per mol of organic compound to be dehydrogenated. Economic and process considerations will normally dictate the exact amount of ammonium halide to be employed.

The minimum amount of oxygen employed is critical and must be at least about one-fourth mol of oxygen per mol of organic compound to be dehydrogenated. Large amounts as about 3 mols of oxygen per mol of organic compound may be employed. Excellent yields of the desired unsaturated derivatives have been obtained with amounts of oxygen from about 0.4 to about 1.5 mols of oxygen per mol of organic compound, and within the range of about 0.4 to 2 mols of oxygen per mol of organic compound, the economic, production and process considerations will dictate more exactly the normal ratio of oxygen to be used. Oxygen is supplied to the reaction system as pure oxygen, or may be diluted with inert gases such as helium, carbon dioxide, or may be supplied as air and the like. In relation to ammonium halide the amount of oxygen employed normally will be greater than 1.25 gram mols of oxygen per gram mol of ammonium halide present in the reaction mixture, and more preferably greater than 1.5 gram mols of oxygen per gram mol of ammonium halide.

While the total pressure on systems employing the process of this invention normally will be at or in excess of atmospheric pressure, the partial pressure of the organic compound under reaction conditions normally will be equivalent to below about 15 inches mercury absolute when the total pressure is atmospheric, and more preferably less than 10 inches mercury absolute to realize the advantages of this invention. Better results and higher yields of desired product are normally obtained when the partial pressure of the organic compound is less than about one-fifth of the total pressure. The desired partial pressure is obtained and maintained by techniques known by those skilled in the art including vacuum operations. Steam is particularly advantageous to obtain the required low partial pressure of the organic compound in this process except with those materials which are easily hydrolyzed such as the esters, cyanoalkenes and the like, where vacuum operations may be used. When steam and oxygen or air are employed, the ratio of steam to organic compound is normally within the range of about 5 to 20 mols of organic compound although larger amounts of steam as high as 40 mols have been employed. The degree of dilution of the reactants with steam and the like is related to maintaining the partial pressure of the organic compound in the system at below about one-third atmosphere and preferably below 10 inches mercury absolute when the total pressure on the system is one atmosphere. Excellent yields of the desired unsaturated derivatives are obtained at organic compound partial pressures between about 1 and 5 inches mercury. The lower limit or organic compound partial pressure will be dictated by commercial considerations and normally will be greater than about 0.1 inch of mercury absolute. When the pressure on the reaction system is above one atmosphere, the values for organic compound partial pressure described above will be altered in direct proportion to the increase above one atmosphere.

The reactions involved in the process of this invention are normally exothermic. The range of reaction temperature is from about 400° C. to temperatures as high as 850° C. In most of these reactions, increased yields are normally obtained at higher temperatures than a threshold temperature and these optimum temperatures, which are illustrated in the examples, are readily established by those skilled in the art. The optimum temperature is normally determined as by thermocouple at the maximum temperature of reaction. Usually the temperature of reaction will be from about 450° C. to about 750° C. Excellent results have been obtained in the range of about 550° C. to 750° C.

The flow rates of the gaseous reactants may be varied quite widely and good results have been obtained with organic compound gaseous flow rates ranging from about 0.4 to about 5 liquid volumes of organic compound per volume of reactor packing per hour, the residence or contact time of the reactions in the reaction zone under any given set of reaction conditions depending upon the factors involved in the reaction. Contact times ranging from about 0.01 to about one second at about 550° C. to 750° C. have been found to be satisfactory, however, a wider range of residence times may be employed but in the case of shorter residence times lower yields are generally obtained, and in the case of longer residence times, some loss of desired product or starting material from cracking and the like may ocur. Normally the shortest contact time consonant with optimum yields and operating conditions is desired and readily determined. Residence time is the calculated dwell time of the reaction mixture in the reaction zone assuming the mols of production mixture are equivalent to the mols of feed mixture.

For conducting the reaction, a variety of reactor types may be employed. Fixed bed reactors may be used and fluid and moving bed systems are advantageously applied to the process of this invention. In any of the reactors suitable means for heat removal may be provided. Tubular reactors of small diameter may be employed and large diameter reactors which are loaded or packed with packing materials are very satisfactory.

While the process of this invention may be conducted in the presence of inert surfaces both in reactor walls and as reactor packing materials, higher yields of desired product and conversion-selectivity are obtained when the reaction is conducted in the presence of metals and their compounds. These metals may be considered as additional catalysts for the dehydrogenation process although their function and mode of operation is not completely understood. A variety of metals and reactive inorganic compounds thereof such as salts, oxides, hydroxides and the like have been found quite unexpectedly to be effective in the obtainment of high conversion, selectivity and yield of the desired dehydrogenated product in accordance with the process of this invention. The metals or compounds thereof may be present as reactor packings per se, distributed on the surface of supporting materials, in the form of pellets or rings, and in the case of small diameter tubular reactors, as the metals themselves. The following materials have been successfully used: Stainless steel in small diameter tubular reactors, stainless steel wool and stainless steel rings, rock salt, potassium phosphate, vanadium pentoxide, barium sulfide, manganous chloride, antimony trioxide, zirconium oxide, zinc sulfate, cobalt nitrate, lead acetate, lead oxide, cerium oxide, ceramic Berl saddles, porcelain Berl saddles, nickel, iron, calcium carbonate, aluminum oxide, chromium oxide and copper. Examples of other useful compounds include iron oxide, bismuth oxide, titanium oxide, tin oxide, manganese oxide, molybdenum oxide, cobalt oxide, nickel oxide, tungstic acid, palladium oxide, magnesium oxide, lanthanum oxide, columbium oxide, calcium oxide, magnesium phosphate, lithium oxide, lithium phosphate, sodium fluoride, manganese, chromium, aluminum phosphate, vanadium oxyphosphate, molybdenum antimonate, calcium carbonate, calcium sulfate, sodium hydroxide, potassium oxide, ferrous bromide, chromic chloride, cobalt bromide, manganese bromide, iron phosphide, potassium silicate, molybdenum phosphate, potassium phosphate, barium oxide, potassium carbonate, potassium fluoride, strontium oxide, calcium fluoride, iron chloride, chromium phosphate, calcium hydroxide, bismuth hydroxide, barium carbonate, iron carbonate, iron sulfate, sodium oxide, iron hydroxide, lithium bromide, bismuth phosphate, iron phosphate and titanium and iron alloys. Mixtures of the materials listed above in any combination of two or more are also useful.

In general any metal, inorganic salt, oxide, hydroxide or other compound thereof and mixtures thereof are effective in the process of this invention. Of course, in fixed bed reactors, those metals which do not vaporize, volatilize or sublime at the tempertaure of reaction are most useful. Of those which are not solid at the reaction temperatures, of course, fluid bed and similar reactors may be employed. Those metals, salts and oxides thereof which are solid at the temperature of reaction are most useful and may be used in both fixed and fluid bed systems.

Many of these metals, salts and hydroxides may change during the preparation of the catalyst, during heating in a reactor prior to use in the process of this invention, or are converted to another form under the described reaction conditions, but such materials still function as an effective compound in the defined process to give increased yields of unsaturated organic compounds. Most metals, nitrites, nitrates, carbonates, hydroxides, acetates, sulfites, silicates, sulfides and the like are readily converted to the corresponding oxide under the reaction conditions defined herein. For instance, potassium nitrate, iron sulfate and bismuth hydroxide are all converted to the corresponding oxides while being heated in a reactor to a reaction temperature of about 500° C. Such salts as the phosphates, sulfates, halides, some carbonates, and hydroxides and the like, of the defined metal groups, which are normally stable at the defined reaction temperatures are likewise effective under the conditions of the described reaction, as well as such compounds as the metal stannates, molybdenates, antimonates, bismuthates and the like. Particularly effective in the process of this invention are the defined metals and their oxides. In addition, any metal or compound thereof of these groups which are convertible to or are converted under the described reaction conditions to an active catalytic state as the metal, oxide or salt thereof are likewise effective in the process of this invention. The metal oxides and salts represent a useful group of materials, since they are inexpensive and are readily formed into pellets or deposited on carriers, and may be readily formed in situ.

The combination of an organic compound at low partial pressure, ammonium halide, oxygen and a metal or compound thereof, at an elevated temperature, involve complex reactions under conditions that make it difficult to determine the exact mechanism of the reaction involved. The conditions for practicing the invention are set forth in detail herein. Any metal or active compound thereof of the nature described which is effective in and contributes to the defined process; that is, which increases the yield of desired dehydrogenated derivative in the defined system, when present, should be included within the scope of the invention. The exact state of the active metal compound during the course of reaction, of course, is difficult to determine, but it has been found that any reactive inorganic material which presents a polar or ionic surface so that it is available during the course of reaction, or one in which the active reaction surface remains available for reaction under the conditions of the reaction, will be effective and satisfactory in the process of this invention.

It will be readily recognized by the man skilled in the art that efficient and economical operations under the described reaction conditions will be a factor in the selection of a particular catalyst material or combination of catalyst materials. Stainless steel is a useful material because of its activity, stability, ease of handling and the like. Any of the stainless steels, which contain about 4 to 27 percent chromium, from 0 to 15 percent nickel, and in some instances a small amount of molybdenum or manganese, may be employed. Particularly useful are many other combinations and alloys of the various metals found in the defined groups above, and porcelain and ceramic Berl saddles and Raschig rings. The metals may be used in the form of mesh, pellets, small diameter tubular reactors and the like. Metals and compounds thereof which have low melting points are suitably employed for example on porous carriers. The technique of fluidized beds lends itself well to the process of this invention.

In the selection of the particular metal or compound thereof, in order to obtain optimum results, a variety of factors are involved and while improved yields and conversions are obtained with a great variety of materials certain ones will normally be more preferred on an industrial basis. For example, in fixed bed operations such metals as aluminum, bismuth, cadmium, lead, lithium, potassium, tin, zinc and the like have melting points generally below some of the more preferred reaction temperatures and while such materials could be used, the engineering complications do not make them more desired materials. However, it should be noted that the oxides and salts of most of these same metals are quite satisfactory at the normal temperatures of reaction. Aluminum oxide, bismuth oxide, lead oxide, magnesium oxide, potassium oxide, tin oxide and zinc oxide all may be used, but in the case of lead and zinc oxide, some difficulty is experienced in fixed beds in using these materials at the higher temperatures of reaction. A further consideration in selecting metals for the process of this invention is the susceptibility to attack by halogens and hydrogen halide. For example, calcium and copper which have satisfactory melting points are readily attacked by halogens and thus corrosion problems would be involved in long term operations. Iron itself is subject to some attack of halogens under the reaction conditions so that it would not be a more preferred reactor packing. While nickel is a satisfactory material, it is often subject to nitriding which may be caused by the presence of ammonia in the system. However, oxides and salts of these materials are quite satisfactory. The preferred materials then, for use in large scale operations, would be those metals with melting points above that of the reaction temperature, i.e., 750° C., and some resistance to attack by halogens, as well as oxides, hydroxides and salts of the metals which would be solid at the temperature of reaction.

A preferred group of materials are the metals, salts, oxides and hydroxides thereof of Groups IA, IIA, IIIB, IVB, VB, VIB, VIIB, VIII, IB, IIB, IIIA, IVA and VA of the Periodic Table which are solid under the reaction conditions of the process of this invention. These groups are based on the conventional long form of the Periodic Table as the Periodic Chart found on pages 400–401 of the 39th edition (1957–58) of the Handbook of Chemistry and Physics (Chemical Rubber Publishing Company).

The ammonium halide may be introduced into the reactor system in a variety of ways. One useful expedient is an aqueous solution of the ammonium halide which may be added to the reaction system either separately or mixed with the other reactants. The concentration of ammonium halide in solution may be varied depending upon operating conditions and may be as low as one percent or less up to aqueous solutions saturated with the ammonium halide. When dilute solutions of the ammonium halide are employed the water of the solution may replace part of the steam requirements for a system where steam is used. In operations the solution is normally preheated prior to entering the reaction zone. Finely divided ammonium halide may be added to the reactor by means so that it is adequately dispersed throughout the reaction zone. Aqueous solutions of ammonium halide from 1 percent to 60 percent have been successfully used in the process of this invention and 10 to 35 percent solutions will be more usually used. Of course, ammonium hydroxide and the appropriate hydrogen halide may be premixed to provide the ammonium halide solution.

By means of this invention there is provided not only a novel process for dehydrogenating organic compounds, but further a novel and improved continuous system of operation is provided wherein the ammonium halide is recovered from the exit stream from a dehydrogenation reactor as the ammonium halide, thus decreasing corrosion problems associated with halogens, and more particularly, eliminating complex recovery procedures for recovering halogens or hydrogen halides, which then must be treated to liberate the halogen for use again. Thus, in accordance with this invention, an incomplex system is provided where an ammonium halide is employed for dehydrogenation and the ammonium halide used in the dehydrogenation reaction may be recovered from the reactor effluent. It is then only necessary to separate the ammonium halide from the exit stream, and recycle or return either intermittently or continuously the condensed ammonium halide solution to the reactor to be used in the reaction again. Thus, in addition to the other advantages provided by the use of an ammonium halide, including decreased corrosion problems and less undesirable by-products from a high temperature dehydrogenation reaction, the ammonium halide needs only be condensed and recycled to the reactor to be used over and over again. The advantages on a commercial scale are many and obvious. The ammonium halide in dry form and aqueous solutions of ammonium halides are less corrosive and easy to handle. In plant operations where solutions thereof are vaporized, problems of corrosion below the dew point are not nearly so severe as those experienced with other more corrosive materials. In addition, in large scale operations the ammonium halides, particularly ammonium iodide, provide a means whereby it is easy to obtain high yields, conversions and particularly improved selectivity of the desired unsaturated organic compounds. It will be recognized that selectivity is an important factor in any commercial process and that high selectivity represents high conversion of the basic feed stock to the desired product without loss of the feed stock to other intermediates or other undesirable by-products. Further, as has been stated, in the exit gases from the reactor the ammonium halide is readily separated and recovered from the exit stream and expensive and corrosive handling steps are not necessary in order to salvage this material for further use in the reactor. The ammonium halide as recovered may be used as is by simply recycling back into the reactor system with a minimum of separating, handling and corrosion problems.

One scheme for demonstrating the process of this invention in a specific process, the conversion of butene to butadiene-1,3, is as follows: An insulated fixed bed type reactor made of No. 316 stainless steel is packed with one-fourth inch 316 stainless steel Raschig rings. Immediately adjacent the reactor are two preheaters in series. The preheaters are insulated and contain one-fourth inch Alundum grains. Air and steam are fed separately into the first preheater. A 30 percent aqueous solution of ammonium iodide from a reservoir therefor is fed into the system between the first and second preheater. Butene is vaporized and passed through a preheater and fed into the system at the top of the reactor where it contacts and is mixed with the mixture of air, steam and ammonium iodide, which reactor is maintained at about 650° C. The space velocity in the reactor is about 240 gaseous volumes of reactants per volume of stainless steel Raschig rings in the reactor per hour (one liquid hourly space velocity). The effluent from the reactor is quenched with steam at a pressure of 15 p.s.i.g. and thereafter passed into a knockout drum or separator at a gas temperature of about 400° F. The $NH_4I$ solution from the gas stream is filtered and the remaining gases then flow to a condenser for steam and the resulting steam-free gas is passed to a purification zone to be distilled to provide high purity butadiene. The ammonium iodide solution is then filtered and concentrated as by heating, or diluted with water, as the case may be to provide an aqueous ammonium iodide solution of the desired concentration, and then may be recycled back to the ammonium iodide feed unit for use in the reactor again.

Operating the above described equipment under conditions such that the mol ratio of oxygen to butene was 0.69 mol of oxygen per mol of butene, ammonium iodide in amounts to provide 0.046 mol of ammonium iodide per mol of butene, a steam to butene mol ratio of 12.6 mols of steam per mol of butene, at a reaction temperature of 1216° F., 0.938 LHSV (equivalent to a gaseous space velocity of 225), and recycling the ammonium iodide, butadiene-1,3 was obtained in a yield of 87.7 mol percent, at a selectivity of 97.2 mol percent and a conversion of 90.3 mol percent.

Oxygen may be used instead of air. The ammonium iodide solution concentration will be varied as desired but normally will be high, as from about 20 to 50 percent in water. When lower concentration solutions are employed, sufficient heating means to convert the water to steam will be required. The reactor effluent may be quenched with condensed ammonium iodide solution if desired.

On a commercial scale the process of this invention will be a continuous operation. An adiabatic fixed bed reactor is useful in this process. Such reactor will contain as packing or active surface any of the materials described hereinabove. The packing bed depth will be varied within the ranges of about one to six feet, and two to three feet are very satisfactory. The various reactants are added to the reactor in a number of ways. Air, steam and the organic compound will be preheated, the air and steam normally at temperatures above 1000° F. and the hydrocarbon at about 500° to 700° F. The air is preferably introduced close to the reaction zone. The ammonium halide solution may be introduced as by a spray nozzle simultaneously with the introduction of steam or steam mixed with air and may be introduced into such stream as finely divided particles of ammonium halide. The mixture of reactants normally will enter the reaction zone at a temperature of about 800° F. to 1100° F., and the exit gases from the fixed bed reactor will be at about 1300° to 1350° F. The reactor effluent is quenched by injecting water as steam at the effluent exit to cool the gaseous effluent as to about 600° to 800° F. This effluent is then passed to a tray scrubber or other means for condensation of the ammonium iodide solution. Condensed ammonium iodide solution is an excellent material for use in the tray scrubber and under optimum operating conditions this scrubber is operated at about 218° F. top and bottom, to prevent excessive dilution of the ammonium iodide solution with condensed steam. The ammonium iodide is passed to a surge tank and recycled to the top of the reactor or to the tray scrubber as required. The exit gases from the tray scrubber are cooled, compressed, passed to an absorbing tower where carbon dioxide, oxygen, nitrogen and the like are separated and the remaining material passed to purification means.

In the following examples will be found specific embodiments of the invention and details employed in the practice of the invention. LHSV (or v./v./hr.) means, with reference to the flow rate of organic compound, liquid volumes of organic compound per hour per volume of packing or active surface material in the reaction zone. Percent conversion represents mols of organic compound consumed per 100 mols of organic compound fed to a reactor and percent selectivity represents the mols of defined unsaturated organic derivative thereof formed per 100 mols of organic compound consumed. These examples are intended as illustrative only since numerous modifications and variations in accordance with the disclosure herein will be apparent to those skilled in the art.

*Example 1*

A tubular nickel reactor equipped with an external electric furnace was filled with one-fourth inch ceramic Berl saddles. The reactor was heated to about 600° C. and a mixture of air and butene-2 was fed through one line into the top of the reactor and a 5 percent aqueous solution of ammonium iodide was fed from a reservoir through another line into the top of the reactor. The water of solution is converted to steam at the top of the reaction zone. The flow rate of the butene was at the rate of one liquid hourly space velocity. The contact time in the reactor was aboue one-fourth second. The reactor effluent was passed to a condenser to remove ammonium iodide as an aqueous solution which was filtered and recycled back to an ammonium iodide reservoir to be passed to the reactor again. In a typical run in which the oxygen to butene ratio was 0.795 mol of oxygen per mol of butene, the water to butene ratio was 14.6 mols of water per mol of butene, and the ammonium iodide to butene ratio was 0.097 mol of ammonium iodide per mol of butene, at a reaction temperature of 602° C., butadiene-1,3 was obtained in a yield of 87 percent, at a conversion of 88 percent and a selectivity of 98.9 percent. Butadiene-1,3 of a purity greater than 99 percent was readily obtained from the hydrocarbon mixture by extractive distillation either with furfural or copper ammonium acetate and fractionation.

*Example 2*

A ¾ inch inside diameter tubular nickel reactor was packed with one-fourth inch nickel spheres and heated by mean of an external electric furnace to about 640° C. A mixture of air and 2-methyl butene-2 was fed into the top of the reactor through one line and a 10 percent aqueous solution of ammonium iodide was fed through the top of the reactor through another line. The flow rate of methyl butene was 0.4 LHSV and the mol ratio of oxygen, water (as steam) and ammonium iodide to methyl butene was 1.07 mols of oxygen, 26.1 mols of water as steam and 0.36 mol of ammonium iodide per mol of methyl butene. The total flow rate of all materials charged to the reactor was $9.2 \times 10^3$ volumes per volume of nickel spheres per hour. Isoprene was obtained in a yield of 67.6 percent at a conversion of 72.8 percent and a selectivity of 92.75 percent. The ammonium iodide solution was recovered by condensation from the effluent and recycled through the reactor for a 40 hour period.

*Examples 3 through 10*

A variety of packing materials and surfaces are successfully and advantageously used in the process of this invention as demonstrated in this example. A tubular Vycor[1] reactor equipped with an electric furnace was used in these runs. The reactor was packed in each case with the pack-

---

[1] Vycor is the trade name of Corning Glass Works, Corning, N.Y., and is composed of approximately 96 percent silica with the remainder being essentially $B_2O_3$.

ing material or surface described below. The reaction conditions and flow rates for the different runs were substantially constant and were as follows: The mol ratio of oxygen, water as steam, and ammonium iodide per mol of butene-2 were 0.8 mol of oxygen, 14.5 mols of water and 0.08 mol of ammonium iodide per mol of butene-2. The reactions were conducted at 700° C. (except iron) at a flow rate of butene-2 of one-half LHSV. The following packing materials and surfaces were employed in the runs described in this example. Nickel and iron as 14 gauge coiled wire, copper as shredded copper, one-fourth inch ceramic and porcelain Berl saddles, one-fourth inch Vycor Raschig rings, calcium carbonate deposited on one-fourth inch Vycor Raschig rings from a two molar slurry, and 20 percent $Cr_2O_3$ on activated alumina. The results obtained in terms of yield of butadiene-1,3, conversion and selectivity are as follows:

| Run | Packing | Yield, Percent | Conversion, Percent | Selectivity, Percent |
|---|---|---|---|---|
| 3 | Nickel | 59.1 | 68.2 | 87.0 |
| 4 | Iron (650° C.) | 82.7 | 90.1 | 81.7 |
| 5 | Ceramic Berl Saddles | 67.4 | 74.6 | 90.2 |
| 6 | Porcelain Berl Saddles | 45.9 | 52.2 | 88.0 |
| 7 | Calcium Carbonate | 57.1 | 65.2 | 87.2 |
| 8 | Copper | 76.3 | 83.9 | 91.0 |
| 9 | Chromium Oxide on Alumina. | 51.8 | 72.5 | 71.5 |
| 10 | Vycor Raschig Rings | 21.6 | 25.7 | 84.2 |

At the end of the runs the packing materials were examined. The copper packing was corroded and the iron wire was etched and pitted. The remaining catalysts showed no visible corrosion after the reaction.

Examples 11 through 21

The runs of Example 3 were repeated using the same type reactor and the same reaction conditions with other contact surfaces which in each case were coated on 4 to 8 mesh Carborundum pellets from two molar solutions. The following results in terms of butene to butadiene-1,3 were obtained:

| Run | Surface | Yield, Percent | Conversion, Percent | Selectivity, Percent |
|---|---|---|---|---|
| 11 | Rock Salt | 95.8 | 99.9 | 95.8 |
| 12 | Potassium Phosphate | 93.9 | 99.0 | 95.0 |
| 13 | Vanadium Pentoxide | 88.8 | 95.3 | 92.3 |
| 14 | Barium Sulfide | 84.2 | 96.5 | 87.5 |
| 15 | Manganous Chloride | 80.0 | 98.0 | 81.5 |
| 16 | Antimony Trioxide | 76.2 | 92.9 | 82.0 |
| 17 | Zirconium Oxide | 69.5 | 85.3 | 81.1 |
| 18 | Zinc Sulfate | 68.3 | 86.7 | 78.6 |
| 19 | Cobalt Nitrate | 67.8 | 89.6 | 75.6 |
| 20 | Lead Acetate | 84.2 | 91.0 | 92.5 |
| 21 | Carborundum | 33.7 | 40.8 | 82.3 |

These runs illustrate that while commercially acceptable yields of butadiene-1,3 are obtained over the inert Carborundum and Vycor that when the reaction is conducted in the presence of metals and metal compounds, vastly improved yields of butadiene-1,3 are obtained.

Example 22

A tubular nickel reactor equipped as described in Example 1 above was packed with one-fourth inch No. 316 stainless steel rings. In one run a 10 percent ammonium iodide solution was used and the oxygen, water, ammonium iodide mol ratio to butene was 0.8 mol of oxygen, 14.6 mols of water (as steam) and 0.197 mol of ammonium iodide per mol of butene, and LHSV of one and a contact time of about 0.2 second. Butadiene-1,3 was obtained in a yield of 71.6 percent at a conversion of 76.9 percent and selectivity of 93 percent. When ammonium bromide solution was substituted for the ammonium iodide solution under the same reaction conditions and at a molar ratio of 0.197 mol of ammonium bromide per mol of butene, a yield of butadiene-1,3 of 57.7 percent at a conversion of 62.8 percent and a selectivity of 92 percent was obtained.

Examples 23 through 26

Ammonium iodide, ammonium bromide, ammonium chloride and ammonium fluoride solutions each were used in a series of runs to convert butene to butadiene-1,3 under the following reaction conditions: A Vycor reactor equipped with an electric furnace for heating was packed with medium porosity alundum, 4 to 8 mesh size, coated with ceric oxide, the reaction conditions were one LHSV of butene at the temperature indicated below, at an oxygen (as air) butene ratio of 0.94 mol per mol of butene, 0.04 mol of ammonium halide (as 0.7 normal solutions) per mol of butene and water (as steam) 15 mols per mol of butene. Results obtained in these runs are set forth below as yield of butadiene-1,3 at the indicated conversion and selectivity.

| Run | Ammonium Halide | Temp., °C. | Yield, Percent | Conversion, Percent | Selectivity, Percent |
|---|---|---|---|---|---|
| 23 | Ammonium Iodide | 600 | 69.01 | 70.24 | 98.25 |
| 24 | Ammonium Bromide | 600 | 49.27 | 52.96 | 93.03 |
| 25 | Ammonium Chloride | 600 | 24.13 | 31.07 | 77.66 |
| 26 | Ammonium Fluoride | 750 | 31.03 | 48.98 | 63.40 |

Example 27

The runs described in Example 23 above for ammonium iodide were repeated using ammonium iodide solutions of varying concentration. The following yields of butadiene-1,3 were obtained in each case:

| Ammonium Iodide Concentration | Mol Ammonium Iodide per Mol Butene | Temp., °C. | Yield Percent | Conversion, Percent | Selectivity, Percent |
|---|---|---|---|---|---|
| 60% | 0.48 | 550 | 82.74 | 94.34 | 87.70 |
| 60% | 0.48 | 600 | 83.21 | 93.55 | 88.95 |
| 60% | 0.48 | 700 | 79.75 | 87.66 | 90.98 |
| 30% | 0.24 | 650 | 80.45 | 86.19 | 93.34 |
| 15% | 0.12 | 650 | 88.44 | 93.64 | 94.45 |
| 1% | 0.008 | 650 | 45.82 | 55.27 | 82.90 |

Steam was added to the reactor in the case of the more concentrated ammonium iodide solution so that in each case the mols of water used, as stem, was constant at 15 mols of steam per mol of butene.

Examples 28 through 33

A tubular stainless steel reactor made of No. 316 stainless steel was charged with one-fourth inch ceramic Berl saddles for a series of runs in which various organic compounds were dehydrogenated. The temperature of reaction and molar ratio of oxygen per mol of organic compound are found in the table below. 15 mols of water as steam and 0.097 mol of ammonium iodide (as a water solution) per mol of organic compound were used in each run at a LHSV of one. The results in terms of yield, conversion and selectivity of product are set forth in the table below.

| Run | Organic Compound | Temp., °C. | Oxygen, Mols | Dehydrogenated Product | Yield, Percent | Conversion, Percent | Selectivity, Percent |
|---|---|---|---|---|---|---|---|
| 28 | Cyclohexane | 700 | 2.4 | Benzene | 53.4 | 93.2 | 57.3 |
| 29 | Ethyl Cyclohexane | 650 | 3.2 | Styrene | 17.8 | 80.1 | 22.2 |
| 30 | Ethyl Benzene | 700 | 0.8 | do | 57.1 | 60.2 | 94.9 |
| 31 | Methyl Isopropyl Ketone | 575 | 0.8 | Methyl Isopropenyl Ketone | 15.3 | 54.5 | 28.1 |
| 32 | Propionaldehyde | 650 | 0.8 | Acrolein | 61.7 | 97.0 | 63.7 |
| 33 | Propionitrile | 665 | 0.8 | Acrylonitrile | 42.8 | | |

Examples 34 through 36

The tubular stainless steel reactor of Example 28 was packed with one-fourth inch No. 316 stainless steel porous distillation packing material for another series of runs. The temperature of reaction was 700° C., the molar ratio of oxygen to organic compound was 0.8 mol of oxygen per mol of organic compound, 15 mols of water, as steam, per mol of organic compound and 0.097 mol of ammonium iodide per mol of organic compound were employed and the flow rate of organic compound was at the rate of one LHSV. The results obtained in terms of yield, conversion and selectivity for the product are set forth in the table below.

| Run | Organic Compound | Temp., °C. | Oxygen, Mols | Dehydrogenated Product | Yield, Percent | Conversion, Percent | Selectivity, Percent |
|---|---|---|---|---|---|---|---|
| 34 | Isopropyl benzene | 700 | 0.8 | α-Methyl styrene | 47.84 | 55.84 | 85.7 |
| 35 | 2-chlorobutene-2 | 700 | 0.8 | Chlorobutadiene | 20.9 | 77.7 | 26.9 |
| 36 | 2,3-dichlorobutane | 700 | 0.8 | {Chlorobutadiene / 2-chlorobutene-2} | 27.61 / 24.97 | 97.51 | 28.32 |

Examples 37 through 39

A tubular Vycor reactor was filled with one-fourth inch ceramic Berl saddles and the following organic compounds were passed therethrough at a flow rate of one LHSV with air and aqueous ammonium iodide in a molar ratio of oxygen, water (as steam) and ammonium iodide to hydrocarbon of 0.8 mol of oxygen and 0.097 mol of ammonium iodide in 15 mols of water, per mol of hydrocarbon, at the indicated temperature.

| Run | Hydrocarbon | Temp., °C. | Dehydrogenated Derivative | Yield, Percent | Conversion, Percent | Selectivity, Percent |
|---|---|---|---|---|---|---|
| 37 | Isobutane | 700 | Isobutene | 40.4 | 77.5 | 52.1 |
| 38 | Propane | 700 | Propene | 61.2 | 82.7 | 74.0 |
| 39 | Ethyl chloride | 750 | Vinyl chloride | 55.1 | 64.0 | 86.0 |

As is obvious from the above examples and the disclosures herein, the novel process of this invention is applicable to a great variety of organic compounds containing 2 to 20 carbon atoms including the following: Hydrocarbons including both alkanes and alkenes, especially those containing 2 to 6 carbon atoms; carbocyclic compounds containing 6 to 12 carbon atoms, including both alicyclic compounds and aromatic compounds of the formula

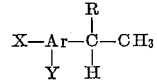

wherein Ar is phenyl or naphthyl, R is hydrogen or methyl and X and Y are hydrogen, alkyl radicals containing 2 to 4 carbon atoms or halogen; alkyl ketones containing 4 to 8 carbon atoms; aliphatic aldehydes containing 3 to 6 carbon atoms; cyanoalkenes from cyanoalkanes wherein the cyanoalkane contains 2 to 6 carbon atoms; halo-alkanes and halo-alkenes contaniing 2 to 6 carbon atoms, particularly chloro- and fluoro-alkanes.

This invention provides a particularly useful process for providing in high yields vinylidene compounds containing the

group, that is, containing a terminal methylene group attached by a double bond to a carbon atom, from organic compounds containing 2 to 12 carbon atoms and at least one

group, wherein adjacent carbon atoms are singly bonded and possess at least one hydrogen atom each. For example, vinylidene halides; vinylidene cyanide; vinyl esters; acrylic acid and alkyl- and halo-acrylic acids and esters, amides and nitriles; vinyl aromatic compounds; vinyl ethers; vinyl ketones; vinyl heterocyclic compounds including vinyl pyridine and vinyl pyrrolidone; butadiene, isoprene and similar diolefins containing 4 to 6 carbon atoms, and olefins containing 2 to 8 carbon atoms, and the like. It is obvious that in the grouping

one of the carbon atoms may be doubly bonded to another substituent as

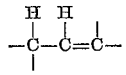

The vinylidene compounds normally contain from 2 to 12 carbon atoms and are well known as a commercially useful class of materials for making polymers and copolymers therefrom.

I claim:

1. A method for dehydrogenating an organic compound selected from the group consisting of alkanes and alkenes containing 2 to 5 carbon atoms, carbocyclic compounds containing 6 to 12 carbon atoms, alkyl ketones, aliphatic acids and aldehydes containing 3 to 6 carbon atoms, cyanoalkanes containing 2 to 6 carbon atoms, and haloalkanes and haloalkenes containing 2 to 6 carbon atoms which comprises reacting said organic compound in the vapor phase at a temperature of about 400° C. to about 850° C. with oxygen in a molar ratio of at least about one-fourth mol of oxygen per mol of said organic compound and at least about 0.001 mol of an ammonium halide per mol of said organic compound, at a partial pressure of said organic compound equivalent to less than one-half atmosphere at a total pressure of one atmosphere.

2. A continuous method for dehydrogenating organic compounds selected from the group consisting of alkanes and alkenes containing 2 to 5 carbon atoms, carbocyclic compounds containing 6 to 12 carbon atoms, alkyl ketones, aliphatic acids and aldehydes containing 3 to 6 carbon atoms, cyanoalkanes containing 2 to 6 carbon atoms, and haloalkanes and haloalkenes containing 2 to 6 carbon atoms which comprises passing through a reactor in vapor phase at a temperature of about 400° C. to about 850° C. said organic compound with oxygen in a molar ratio of one-fourth about 3 mols of oxygen per mol of said organic compound and at least about 0.001 mol of an ammonium halide per mol of said organic compound in the presence of a catalyst selected from the group consisting of metals and salts, oxides and hydroxides thereof having melting points above the reaction temperature, at a partial pressure of said organic compound equivalent to less than one-half atmosphere at a total pressure of one atmosphere, recovering said ammonium halide from the reactants and recycling said ammonium halide through a reactor with additional organic compound and oxygen.

3. A method for dehydrogenating an organic compound selected from the group consisting of alkanes and alkenes containing 2 to 5 carbon atoms, carbocyclis compounds containing 6 to 12 carbon atoms, alkyl ketones, aliphatic acids and aldehydes containing 3 to 6 carbon atoms, and haloalkanes and haloalkenes containing 2 to 6 carbon atoms which comprises reacting said organic compound in the vapor phase at a temperature of about 450° C. to about 800° C. with oxygen in a molar ratio of about one-fourth to about 3 mols of oxygen per mol of said organic compound and at least about 0.01 mol of an ammonium halide per mol of said organic compound in the presence of a catalyst selected from the group consisting of metals and salts, oxides and hydroxides thereof having melting points above 750° C., at a partial pressure of said organic compound equivalent to less than one-third atmosphere at a total pressure of one atmosphere.

4. The method of claim 3 wherein the catalyst comprises iron.

5. The method of claim 3 wherein the ammonium halide is ammonium chloride.

6. The method of claim 3 wherein the catalyst contains iron oxide.

7. A continuous method for dehydrogenating hydrocarbons which comprises passing through a reactor in the vapor phase at a temperature of about 400° C. to about 850° C. a hydrocarbon with oxygen in a molar ratio of above one-fourth to about 3 mols of oxygen per mol of hydrocarbon and at least 0.001 mol of ammonium halide per mol of hydrocarbon at a partial pressure of said hydrocarbon equivalent to less than about one-half atmosphere at a total pressure of one atmosphere, recovering said ammonium halide from the exit gases of said reactor and recycling said ammonium halide with additional organic compound and oxygen.

8. A method for dehydrogenating hydrocarbons which comprises reacting in the vapor phase at a temperature of about 400° C. to about 850° C. hydrocarbons with oxygen in a molar ratio of about 0.4 to about 2 mols of oxygen per mol of hydrocarbon and above about 0.01 to less than 0.5 mol of ammonium halide per mol of hydrocarbon at a partial pressure of hydrocarbon equivalent to less than one-third atmosphere at a total pressure of one atmosphere.

9. A method for dehydrogenating hydrocarbons which comprises reacting in the vapor phase at a temperature of about 400° C. to about 850° C. a hydrocarbon with oxygen in a molar ratio of about 0.4 to about 2 mols of oxygen per mol of said hydrocarbon and about 0.01 to less than 0.5 mol of ammonium halide per mole of said hydrocarbon at a partial pressure of said hydrocarbon equivalent to less than one-third atmosphere at a total pressure of one atmosphere, said oxygen and ammonium halide being present in a molar ratio of greater than 1.25 gram mols of oxygen per gram mol of ammonium halide.

10. The method of claim 9 wherein the ammonium halide is ammonium iodide.

11. The method of claim 9 wherein the ammonium halide is ammonium bromide.

12. The method of claim 9 wherein the ammonium halide is ammonium chloride.

13. A method for dehydrogenating hydrocarbons containing 2 to 6 carbon atoms which comprises reacting in the vapor phase at a temperature of about 400° C. to about 850° C. said hydrocarbons with oxygen in a molar ratio of between 0.25 and 3 mols of oxygen per mol of hydrocarbon and greater than about 0.001 mol of ammonium halide per mol of hydrocarbon at a partial pressure of hydrocarbon equivalent to less than about one-half atmosphere at a total pressure of one atmosphere.

14. A method for preparing conjugated diolefins containing 4 to 5 carbon atoms which comprises reacting in the vapor phase at elevated temperatures a hydrocarbon of 4 to 5 carbon atoms with oxygen in a molar ratio of above one-fourth to about 1.5 mols of oxygen per mol of hydrocarbon and from about 0.01 to about one mol of an ammonium halide per mol of hydrocarbon in the presence of solid catalysts selected from the group consisting of metals and salts, oxides and hydroxides thereof having melting points above the reaction temperature, wherein the partial pressure of said hydrocarbon is equivalent to less than one-third atmosphere at a total pressure of one atmosphere.

15. The method for dehydrogenating olefins containing 4 to 5 carbon atoms which comprises reacting in the vapor phase at a temperature in the range of about 450° C. to about 750° C. said olefin with oxygen in a molar ratio of about 0.4 to about 1.5 mols of oxygen per mol of said olefin, and 0.01 to 0.2 mol of an ammonium halide per mol of said olefin in the presence of iron oxide, wherein the partial pressure of said olefin is equivalent to less than one-third atmosphere at a total pressure of one atmosphere, and at a molar ratio of oxygen to ammonium halide of greater than 1.25 gram mols of oxygen per gram mol of ammonium halide.

16. A method for the preparation of butadiene-1,3 which comprises reacting at a temperature of about 400° C. to about 850° C. butene with at least one-fourth mol of oxygen per mol of said butene and at least 0.001 mol of an ammonium halide per mol of said butene at a partial pressure of said butene equivalent to less than about one-half atmosphere at a total pressure of one atmosphere.

17. A method for the preparation of butadiene-1,3 which comprises reacting at a temperature of about 400° C. to 850° C. butene with oxygen in a molar ratio of about 0.4 to about 1.5 mols of oxygen per mol of said butene and about 0.01 to about 0.2 mol of ammonium bromide per mol of said butene, at a partial pressure of said butene equivalent to less than one-fifth atmosphere at a total pressure of one atmosphere.

18. A method for the preparation of butadiene-1,3 which comprises reacting at a temperature of about 400° C. to 850° C. butene with oxygen in a molar ratio of about 0.4 to about 1.5 mols of oxygen per mol of said butene and about 0.01 to about 0.2 mol of ammonium iodide per mol of said butene, at a partial pressure of said butene equivalent to less than one-fifth atmosphere at a total pressure of one atmosphere.

References Cited by the Examiner

UNITED STATES PATENTS

| | | | |
|---|---|---|---|
| 2,370,513 | 2/45 | Amos et al. | 260—680 |
| 2,643,269 | 6/53 | Augustine | 260—604 |
| 2,719,171 | 9/55 | Kalb | 260—680 |
| 2,755,316 | 7/56 | Churchill et al. | 260—651 |
| 2,890,253 | 6/59 | Mullineaux et al. | 260—680 |
| 2,901,520 | 8/59 | Raley et al. | 260—680 |
| 2,945,900 | 7/60 | Alexander et al. | 260—680 |

PAUL M. COUGHLAN, *Primary Examiner.*

ALPHONSO D. SULLIVAN, *Examiner.*